United States Patent [19]
Ichihara

[11] Patent Number: 6,154,440
[45] Date of Patent: Nov. 28, 2000

[54] OPTICAL DISC

[75] Inventor: Katsutaro Ichihara, Yokohama, Japan

[73] Assignee: Kabushiki Kaisha Toshiba, Kawasaki, Japan

[21] Appl. No.: 09/138,341

[22] Filed: Aug. 21, 1998

[30] Foreign Application Priority Data

Aug. 22, 1997 [JP] Japan ................... 9-226721

[51] Int. Cl.$^7$ ................... G11B 7/24
[52] U.S. Cl. ................... 369/275.4
[58] Field of Search ................... 369/275.1, 275.4

[56] References Cited

U.S. PATENT DOCUMENTS

| | | | |
|---|---|---|---|
| 5,459,712 | 10/1995 | Sugaya et al. | 369/275.4 |
| 5,517,486 | 5/1996 | Haneda et al. | 369/275.4 |
| 5,763,037 | 6/1998 | Ohtomo et al. | 369/275.4 |
| 5,798,987 | 8/1998 | Ogawa | 369/275.4 |

OTHER PUBLICATIONS

Nishiyama et al: Digest on 8th Phase–change recording Symposium (in Japanese) pp. 77–81, Nov. 28, 1996.

*Primary Examiner*—Aristotelis M. Psitos
*Attorney, Agent, or Firm*—Pillsbury Madison & Sutro LLP

[57] ABSTRACT

An optical disc comprises a disc substrate having a groove and a land, and a recording layer formed thereon through a transparent film. In such an optical disc, when a width of a land on a flat surface of the disc substrate is $W_L$, a width of the groove is $W_G$, an average angle of inclination of a side wall of the groove is $\theta$, and a film thickness of a transparent film on a flat surface of the disc substrate is $D_U$, the average angle of inclination $\theta$ of a side wall of the groove is 50° or more and, at the same time, a condition of $D_U (1-\cos\theta)/2 \sin\theta \leq W_G - W_L \leq 4D_U (1-\cos\theta)/\sin\theta$ is satisfied. By satisfying such conditions, not on a flat surface of the disc substrate, but at a position of a recording layer, symmetry of a groove portion and a land portion can be enhanced. Therefore, in an optical disc of a land/groove recording/reproducing type, a recording condition of a mark row onto a land and reproducing signal quality and a recording condition of a mark row onto a groove and reproducing signal quality can be made uniform.

4 Claims, 5 Drawing Sheets

OPTICAL DISC

BACKGROUND OF THE INVENTION

1. Field of the Invention

The present invention relates to an optical disc in which recording/reproducing of information is carried out through irradiation of a light beam, in particular, relates to an optical disc in which recording/reproducing is carried out both on a groove and on a land.

2. Description of the Related Art

An optical disc, which records/reproduces information through an irradiation of a light beam on a record carrier, possesses concurrently a large capacity, high speed accessibility, medium portability, and is utilized in various recording systems such as an electronic calculator file, an audio/visual file, a document file and the like. Further, due to a recent increase of dynamic image, a strong demand for high definition image and the like, demand for an enhancement of recording density is strong.

For a record-enable optical disc, on a disc substrate, a groove for tracking guide of a light beam, a so-called groove, is disposed in advance by an injection molding and the like. In a conventional record-enable optical disc, only on a recording layer on this groove or on a recording layer on a land which corresponds to a space between grooves, a data-mark is recorded. The reason for this is that, since a width of divergence of a light spot (the width where the strength decreases to $e^{-2}$ of the central strength) is larger than a groove width or a land width, when recording is carried out on both a groove area and a land area, a cross-talk becomes extremely large, thereby, signal quality is damaged.

On the other hand, it is made clear that, when a depth of a groove is adjusted considering a phase of the reflected light from a recording layer, due to its optical interference effect, the signal from the land portion can be made negligible small during reproduction of the groove portion, in addition, the signal from the groove portion can be made negligible small during reproduction of the land portion. Thereby, with a sufficiently small cross-talk amount, on both the land portion and the groove portion, recording is made possible. Such a recording method is called a land/groove (L/G) recording, and is proposed as one technology enhancing a surface recording density of an optical disc.

However, in the conventional L/G recording, because of lack of consideration on a coverage of a film onto a groove-step, there has occurred a problem that an effective land width and groove width at the position of the recording layer do not coincide. Thereby, recording/reproducing characteristics on the land and the recording/reproducing characteristics on the groove do not coincide, resulting in a problem of damaging an operation margin.

Such a problem is not remarkable in the case of an optical disc in which a recording layer is directly formed on a substrate, for instance, of a WORM disc, however, becomes extremely remarkable in the case of a write-enable optical disc in which a transparent film providing an optical interference function and a protection function is disposed between the substrate and the recording layer.

Further, in order to suppress cross-erase, a so-called deep groove in which a depth of a groove is made deep is proposed, but, in such a deep groove, an influence of the coverage of a film onto the a groove-step becomes more remarkable.

Thus, in the conventional optical disc, it has been very difficult to realize a L/G recording which is low both in cross-talk and cross-erase, furthermore to make coincide the land characteristics and the groove characteristics.

On the other hand, in an optical disc in which a metallic reflective film high in its thermal conductivity is disposed at an upper portion of a surface of an opposite side to the substrate of the recording layer, for instance, such as a magneto-optical disc and a phase-change type optical disc, due to thermal unsymmetry of the land portion and the groove portion, there has occurred a problem that thermal response of the land portion and the groove portion are different. This causes deterioration of recording power margin.

As a simple method making coincide characteristics of the land portion and the groove portion as described above, there is a method in which, by detecting whether a light spot is irradiating the land portion or is irradiating the groove portion, according to the optimum operation condition for the land portion and the groove portion which are written in advance in a lead-in area and the like, recording/reproducing is sorted.

However, when there occurs an error in detection of the land portion and the groove portion in this method, since the unsymmetry of the land portion and the groove portion becomes more remarkable, prevention of the detection error becomes important. Therefore, there is a problem that a circuit scale for preventing the detection error becomes extremely large.

SUMMARY OF THE INVENTION

Therefore, an object of the present invention is to provide an optical disc which made possible, without detecting whether a light spot is irradiating a land portion or irradiating on a groove portion, to make uniform a recording condition of a mark row onto a land and reproducing signal quality, a recording condition of a mark row onto a groove and reproducing signal quality.

An optical disc of the present invention comprises a disc substrate having a groove formed on its main surface and a land disposed between the grooves, a transparent film formed on the main surface of the disc substrate, and a recording layer which is formed on the transparent film and, on both the groove and the land thereof, signal is recorded, wherein, when a width of the land in the main surface of the disc substrate is $W_L$, a width of the groove in the main surface of the disc substrate is $W_G$, an average angle of inclination of a side wall of the groove is $\theta$, and a film thickness of the transparent film on a flat surface of the disc substrate is $D_U$, the average angle of inclination of a side wall of the groove, $\theta$, is 50° or more and, at the same time, a relation of $D_U(1-\cos\theta)/2 \sin\theta \leq W_G - W_L \leq 4D_U(1-\cos\theta)/\sin\theta$ is satisfied.

An optical disc of the present invention is particularly effective in a case where, when a depth of a groove is $D_g$, a refractive index of a disc substrate is n, and an wavelength of a light beam irradiated on a recording layer is $\lambda$, $D_g > \lambda/4n$ is satisfied. In such a case, an average angle of inclination of a side wall of a groove is preferable to be 60° or more. Further, in a case where a reflective layer high in its thermal conductivity than that of a disc substrate is disposed on a recording layer, a value of $W_G - W_L$ is preferable to be made $3D_U(1-\cos\theta)/\sin\theta$ or less.

In an optical disc of the present invention, an average angle of inclination of a side wall of a groove, $\theta$, is made 50° or more to suppress an increase of a fundamental noise. Furthermore, considering a step-coverage of a transparent film and a recording layer onto a groove-step portion between a groove and a land, an width of a land $W_L$ and a width of a groove $W_G$ on a main surface of a disc substrate satisfy a relation of $D_U(1-\cos \theta)/2 \sin \theta \leq W_G - W_L \leq 4D_U (1-\cos \theta)/\sin \theta$.

By satisfying these above described relations, not on a flat surface of a disc substrate, but at a position of a recording layer, symmetry of a groove portion and a land portion can be enhanced. Therefore, without detecting particularly whether a light spot is irradiating a land portion or a groove portion, a recording condition of a mark row onto a land portion and a reproducing signal quality, and a recording condition of a mark row onto a groove portion and a reproducing signal quality can be made uniform. Thereby, an excellent operation margin can be obtained.

DESCRIPTION OF THE PREFERRED EMBODIMENTS

In the following, embodiments carrying out the present invention will be described with reference to the drawings.

Figure 1:
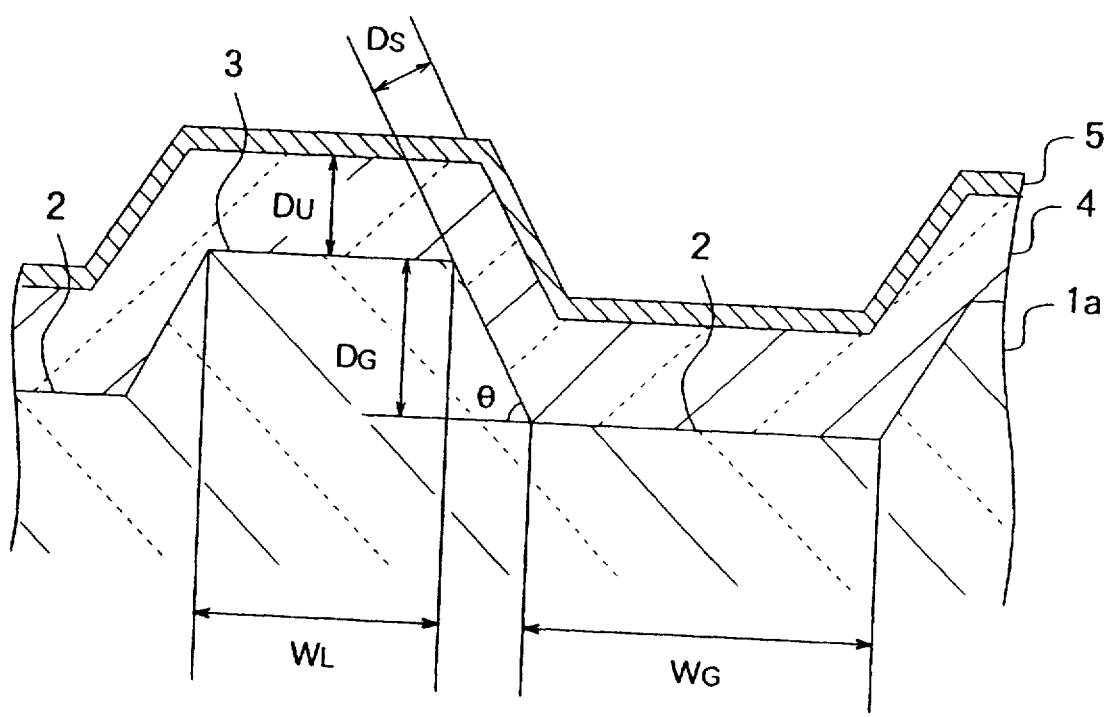
FIG. 1 is a cross-sectional view showing a structure of an essential portion of one embodiment of an optical disc of the present invention.

FIG. 1 is a cross-sectional view showing diagrammatically a structure of an essential portion of one embodiment of an optical disc of the present invention. In this figure, reference numeral 1 is a disc substrate consisting of a resin substrate and the like. On 1a side of a main surface of the disc substrate 1, grooves 2 are formed. Between these grooves 2, there are lands 3. These grooves 2 and lands 3 have at least a flat surface in a plane perpendicular to a direction of incidence of a light beam, they are preferable not to have V-character shaped cross-section because of signal symmetry of the land/groove.

On a main surface 1a of a disc substrate 1 on which a groove 2 and a land 3 are disposed, a transparent film 4 giving an optical interference function and a protection function is disposed. For this transparent film 4, for instance, $ZnS-SiO_2$, $Ta_2O_5$, $Si_3N_4$, AlN and the like can be used. On the transparent film 4, a recording layer 5 is disposed. The recording layer 5 is constituted in such a manner that recording/reproduction can be carried out on both the flat surface of the groove 2 and the flat surface of the land 3. Data marks are recorded on both the recording layer 5 on the groove 2 and the recording layer 5 on the land 3.

Here, the present invention can be applied to various kinds of optical discs in which recording/reproduction of information is carried out through irradiation of a light beam, for instance, such as a phase-change type optical disc and an magneto-optical disc. Further, it can be applied to an WORM disc and the like having a transparent film. Therefore, for the recording layer 5, materials corresponding to the kind of the optical disc can be used. For instance, for the phase-change type optical disc, Ge—Sb—Te, Ag—In—Sb—Te and the like are employed for the recording layer 5. In an magneto-optical disc, various kinds of magnetic materials can be employed. A light beam for recording/reproducing is irradiated to a recording layer 5 from a side of a disc substrate 1.

In addition, though being omitted in FIG. 1, at an upper portion of a recording layer 5, according to demands, a second transparent film, further, a reflective film can be disposed.

The following Embodiment 1, 2 as specific examples of the present invention are examples of optical discs having a structure in which only a second transparent film is disposed on a recording layer 5. Further, the evaluated results of such optical discs will be described.

In an optical disc shown in FIG. 1, $W_G$ is a width (a width of a flat surface) of a groove 2 on a main surface 1a of a disc substrate 1, $W_L$ is similarly a width (a width of a flat surface) of a land 3 on a main surface 1a of a disc substrate. $D_G$ is a depth of a groove 2. θ is an average angle of inclination of a side wall of a groove 2, that is, an average angle of inclination of a groove-step portion between a flat surface of a groove 2 and a flat surface of a land 3. $D_U$ is a film thickness on a flat surface of a first transparent film 4 disposed between a disc substrate 1 and a recording layer 5, $D_S$ is a film thickness on a bump portion of a first transparent 4.

In an optical disc of this embodiment, recording/reproducing is carried out at both a portion corresponding to above a groove 2 of a recording layer 5 (groove portion) and a portion corresponding to above a land 3 of a recording layer 5 (land portion). In such an optical disc, a width of a groove 2 $W_G$, a width of a land 3 $W_L$, an average angle of inclination of a side wall of a groove 2 θ, and a film thickness of a first transparent film 4 on a flat surface $D_U$, satisfy the following conditions of equation (1) and equation (2).

$$\theta \geq 50° \quad (1)$$

$$D_U(1-\cos \theta)/2 \sin \theta \leq W_G - W_L \leq 4D_U(1-\cos \theta)/\sin \theta \quad (2)$$

As will be described in detail in the following evaluation results, by satisfying the condition of the equation (1), an increase of fundamental noise can be suppressed. Further, by satisfying the condition of the equation (2), not on a main surface 1a of a disc substrate 1, at a position of a recording layer 5, symmetry of a groove portion and a land portion can be heightened. Therefore, recording/reproducing characteristics on a groove 2 and recording/reproducing characteristics on a land 3 coincide, thereby, excellent operation margin can be obtained.

That is, according to an optical disc of this embodiment, without detecting whether a light spot is irradiating on a land portion or irradiating on a groove portion, a recording condition of a mark row onto a land portion and reproducing signal quality, and a recording condition of a mark row onto a groove portion and reproducing signal quality can be made uniform.

Figure 2:
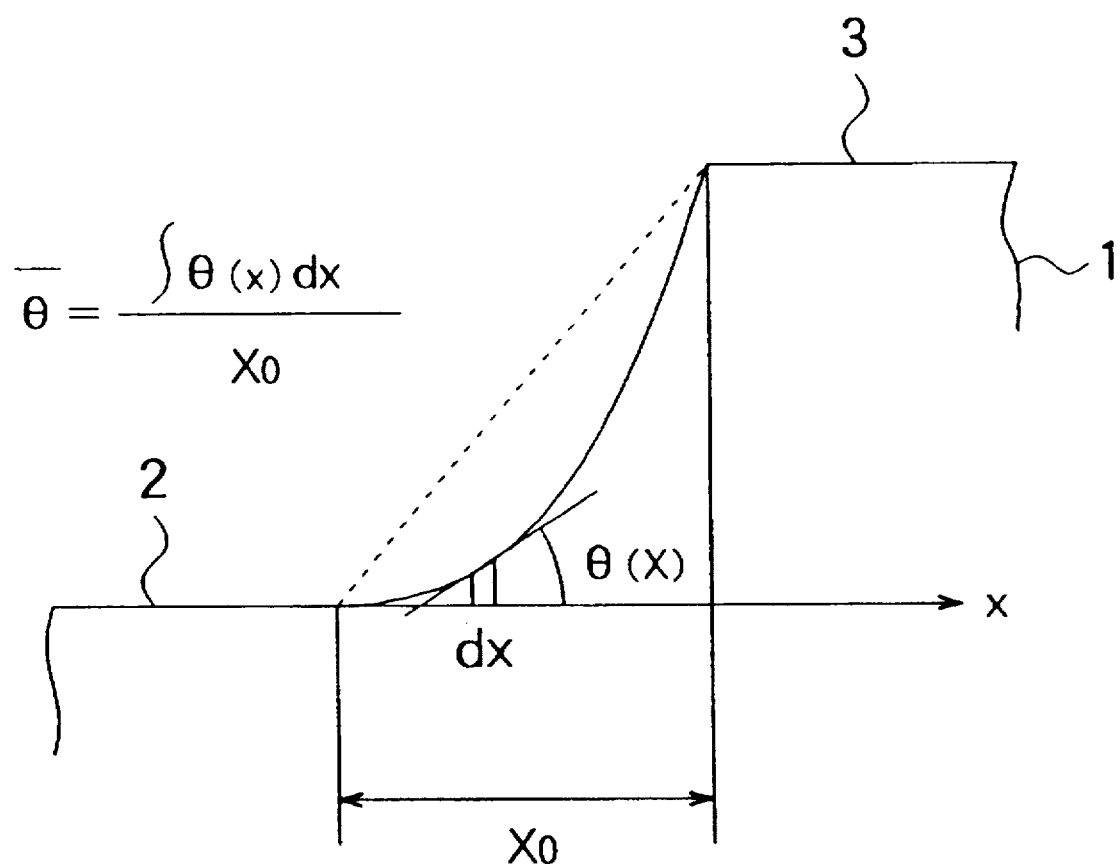
FIG. 2 is a diagram explaining an average angle of inclination, θ, when a side wall of a groove is not linear in an optical disc of the present invention.

An optical disc of the present invention can be applied to a case where a side wall of a groove 2 is not necessarily linear. As θ in such a case, an averaged angle can be applied. That is, as shown in FIG. 2, when a side wall of a groove 2 forms a curved surface, by investigating an angle (θ (x)), which an infinitesimal small element (dx) of a side wall and a flat surface form, over a whole side wall to find out a distribution function of the angle, an average value thereof, $\theta$ ($=\int \theta(x)dx/x_0$), can be obtained.

An optical disc of the above described structure can be produced with, for instance, the following procedure.

To prepare a disc substrate 1, first, on a glass master piece, a resist corresponding to a thickness of $D_G$ is coated. After exposed to be a pre-determined groove width and a land width with a master piece exposure device, through development, a groove pattern is formed on the resist. According to demands, other than the groove, a pattern such as an address pit and the like can be exposed/developed.

Incidentally, in embodiment 1, with an object to use for evaluation of characteristics described later, a pit row is disposed so as to enable to distinguish a groove 2 and a land 3.

Subsequently, on a resist on which a groove pattern is formed, after sputtering or vapor evaporating of an electrode film, Ni is electrotyped with electroplating to form a stamper. The stamper, after being peeled off a master piece, is mounted on an injection molding machine, by injecting a transparent resin such as poly-carbonate resin and the like, a disc substrate 1 shown in FIG. 1 can be obtained.

In embodiment 1, with an object to demonstrate an effect of the present invention, by changing the condition of the above described exposure process, optical discs in which $W_G$, $W_L$, $D_G$ and $\theta$ are varied in various manner are produced. However, with an object to evaluate at the same track density, $W_G+W_L+2D_G \cot\theta$ corresponding to twice of track pitch is made a definite value of 1.2 μm. Each numeral value will be described later together with evaluation results.

In embodiment 1, thus obtained disc substrate is mounted on a substrate holder of a sputtering device to form a phase-change medium film. In specific, after a ZnS—SiO$_2$ film of a film thickness of $D_U$(nm) as a first transparent film 4 is formed on a disc substrate 1, a GeSbTb film of a film thickness of 50 nm is stacked as a recording layer 5. Further thereon, a ZnS—SiO$_2$ film of a film thickness of 100 nm is stacked as a second transparent film. Further, film thickness $D_U$ of a first transparent film 4 will be shown explicitly in the evaluated data that is described later.

Here, the present invention takes notice of a step-coverage of a film onto a groove-step, the step-coverage is also influenced by sputtering methods. Then, as a sputtering method, several methods different in relative positions, which seemed to have large influence on the step-coverage, between a sputtering target and a substrate, were adopted. The adopted sputtering methods were an eccentric rotation revolution sputtering method, a static opposing sputtering method, an eccentric rotation sputtering method, all of them are being adopted in production of medium films of optical disc.

Among the above described sputtering methods, in an eccentric rotation revolution sputtering method, a central axis of a target and a central axis of a substrate are shifted, a substrate rotates and revolves on a plane opposing to a target. In a static opposing method, both the axes coincide, a film is formed without rotating a substrate. In an eccentric rotation method, both axes are shifted each other, a substrate rotates at a slanting position of a plane opposing to a target. A step-coverage onto a groove-step portion is the best in the eccentric rotation revolution method, followed by the eccentric rotation method, the static opposing method, in this order.

Preceding production of an optical disc, with an object to catch the coverage of each sputtering method, on a test chip having a groove-step of an angle of inclination of about 90°, a ZnS—SiO$_2$ film of 150 nm is formed (corresponds to $D_U$ in FIG. 1), a throwing power thereof is studied with cross-section TEM. As the result, a film thickness on a side wall of a groove-step portion (corresponds to $D_S$ in FIG. 1) is nearly equal with $D_U$ for an eccentric rotation revolution method. With an eccentric rotation method, though depending on an eccentric amount and a distance between target-substrate, $D_S$ was about 80% to 25% of $D_U$. In a static opposing method, $D_S$ was about 12.5% of $D_U$. In the static opposing method, by disposing a collimator and such, $D_S$ can be made further thin, but, disposition of a collimator lowers remarkably production capacity.

With application of each of the above described sputtering methods, a plurality of optical discs were produced with $W_L$, $W_G$, $D_G$, $\theta$, $D_U$ as parameters and were evaluated according to the following procedure. Further, in this embodiment 1, 70 nm of $D_G$ was selected which was the most shallow depth capable of canceling cross-talk. The deep groove will be described later.

$D_U$ were 3 kinds of 50 nm, 100 nm, 150 nm, $W_L$ and $W_G$ were varied in their range according to selection method of $\theta$. However, $W_G+W_L+2D_G \cot\theta$, corresponding to twice of track pitch as described above, is made a definite value of 1.2 μm, and, according to a fundamental thinking of the present invention, a range of $W_G>W_L$ was selected. $\theta$ was varied in the range of 45° to 90°. In Table 1, numeral values of each groove parameter used in the present invention are described.

TABLE 1

| $\theta$ (deg) | $2D_G\cot\theta$ (nm) | $W_L$ (nm) | $W_G$ (nm) | $W_G - W_L$ (nm) |
| --- | --- | --- | --- | --- |
| 45 | 140 | 300 to 530 | 530 to 760 | 0 to 430 |
| 55 | 100 | 300 to 550 | 550 to 800 | 0 to 500 |
| 65 | 65 | 300 to 560 | 565 to 835 | 5 to 535 |
| 75 | 40 | 300 to 580 | 580 to 860 | 0 to 560 |
| 90 | 0 | 300 to 600 | 600 to 900 | 0 to 600 |

In embodiment 1, within the range of Table 1, $W_G$ and $W_L$ were varied with an interval of about 100 nm. With each optical disc, signal symmetry of a land portion and a groove portion was investigated.

First, the optimum recording power and erasing power were investigated with as an index the power where, at land portion and groove portion of the respective optical disc, CNR (carrier/noise ratio) and overwrite erasing rate become the maximum, respectively. At this point, comparison of the absolute values of CNR and the erasing rate was not undertaken. Embodiment 1, since it is an embodiment in which, only a second transparent film of the same thermal constant with a first transparent film 4 was formed on a recording layer 5 in FIG. 1, the optimum values of the recording/erasing power hardly depend on $\theta$, $W_L$, $W_G$, $D_U$, and difference between the land portion and the groove portion was small.

Next, as to the absolute value of the reproducing CNR and the overwrite erasing rate, by taking mainly notice of CNR, groove parameter dependence and land/groove symmetry were evaluated.

Among the conditions shown in Table 1, an optical disc of $\theta$ of 45°, irrespective of any values of $W_L$, $W_G$, $D_U$, was very high in its noise level. It is considered that, since a side wall of a groove 2 is a light scattering factor, when $\theta$ is too small, the effect of scattering becomes large to increase the noise.

In an optical disc of $\theta$ of 55°, there was not observed any extraordinary increase of noise. Thus, to suppress the fundamental noise, an angle of inclination of a side wall of a groove 2 is recognized to be necessary to be 50° or more. The upper limit of $\theta$ is not particularly specified, it can be inversely tapered (θ>90°), but from production point of view, 90° or less is preferred.

Figure 3:
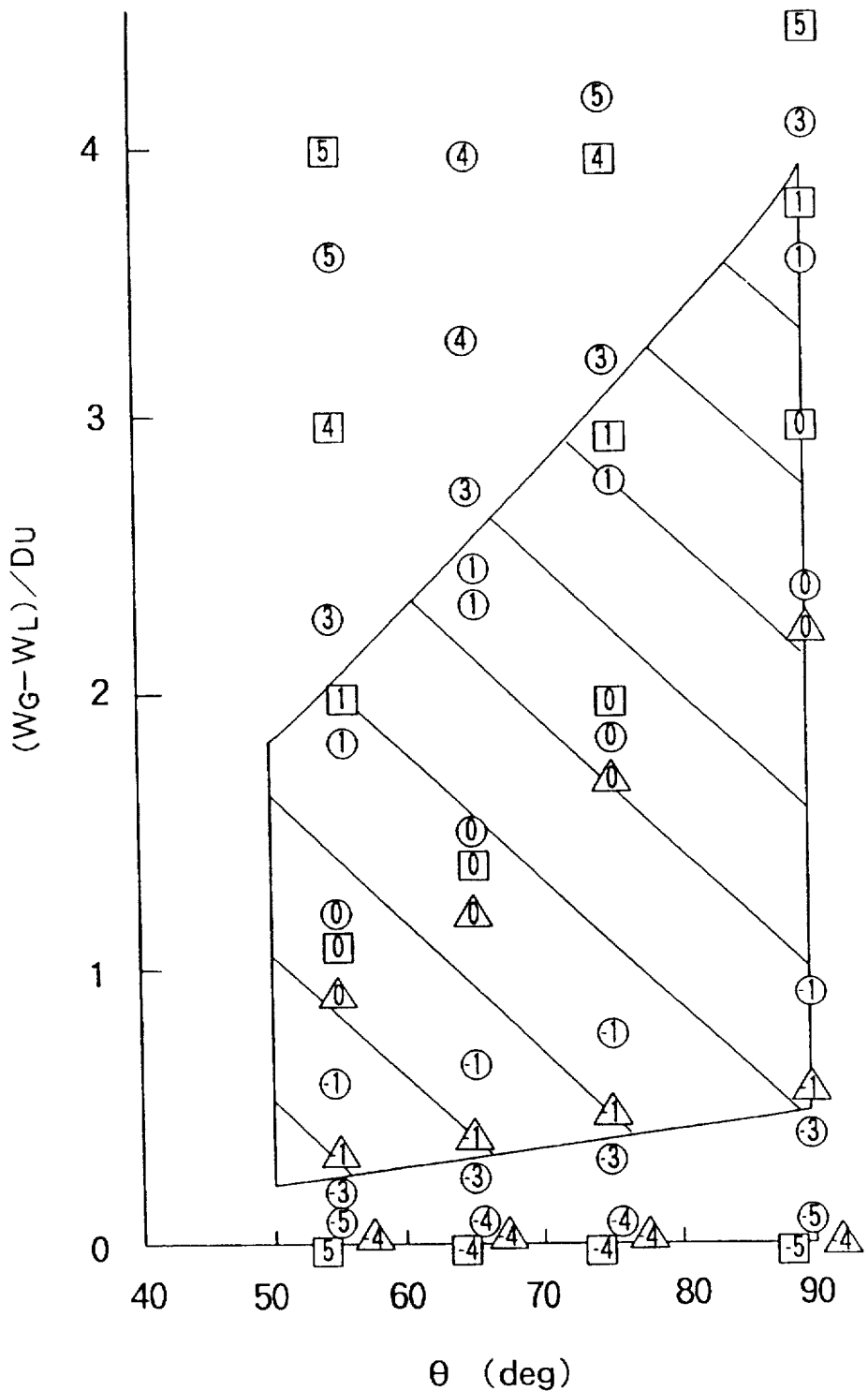
FIG. 3 is a diagram showing results evaluated signal symmetry of land portions and groove portions of optical discs due to embodiment 1 of the present invention.

Further, with optical discs of θ of 50° or more as subject, the signal symmetry of the land portion and the groove portion was evaluated. In specific, it was investigated taking notice of the difference between CNR of the land portion and CNR of the groove portion. In FIG. 3, there are plotted the differences between the land portion and the groove portion of the optical discs produced under various conditions. The numeral in each plot is a value obtained by subtracting the CNR of the land portion from the CNR of the groove portion.

In the plot of FIG. 3, square marks show measured results of optical discs formed in films with the eccentric rotation revolution method. Round marks show measured results of optical discs formed in films with the eccentric rotation method varying the eccentric amount and the target-substrate distance in several levels. Triangle marks show measured results of optical discs formed in films with the static opposing method.

Allowance of the CNR difference depends on the design, when ±1 dB is made a standard of judgement, for all optical discs in which, according to the present invention, the value of $(W_G-W_L)$ are made in the range of $D_U(1-\cos \theta)/2 \sin \theta \leq W_G-W_L \leq 4D_U(1-\cos \theta)/\sin \theta$ (shown with slant lines in FIG. 3), the difference of CNR between the land portion and the groove portion was found to be kept in the range of about ±1 dB. On the contrary, when deviating outside the range of the present invention, the difference was found to increase rapidly. The reason for this is that, according to the present invention, not at the position of the substrate but at the position of the recording layer, the symmetry of the land portion and the groove portion can be realized.

Further, as obvious from FIG. 3, the present invention hardly depend on the difference of the throwing power onto groove-step due to the sputtering method, and can be universally applied even when a medium film was produced with whatever sputtering methods.

The above described embodiment 1 is an example in which the most shallow groove 2 in the cross-talk cancel condition of the depth $D_G$ of the groove 2 being about λ/6n (n: refractive index of disc substrate 1, λ: wavelength of a light beam irradiated to recording layer 5) is used. On the contrary, from the point of view to suppress the cross-erase, the depth of the groove 2, $D_G$, is preferred to satisfy $D_G>\lambda/4n$.

Thus, in embodiment 2, with a deep groove of $D_G$ of 140 nm, that is, with a deep groove of $D_G=\lambda/3n$, as identical as the above described embodiment 1, optical discs were produced varying in their $W_L$, $W_G$, $D_U$, θ. Further, characteristics of these plurality of optical discs were evaluated as identical as embodiment 1. Further, the structure of the film was identical as embodiment 1, no reflective film being used.

As the result, the influence of the groove-step was much remarkable than the case of the shallow groove. Even when θ is 55°, it can be barely used, but, for the deep groove with $D_G$ of λ/4n or more, it was found to be preferable to make θ 60° or more. The reason for this is that, when the groove is simply deepened, for the same θ, the length of the groove-step portion of the cross-section of FIG. 1 becomes long.

Figure 4:
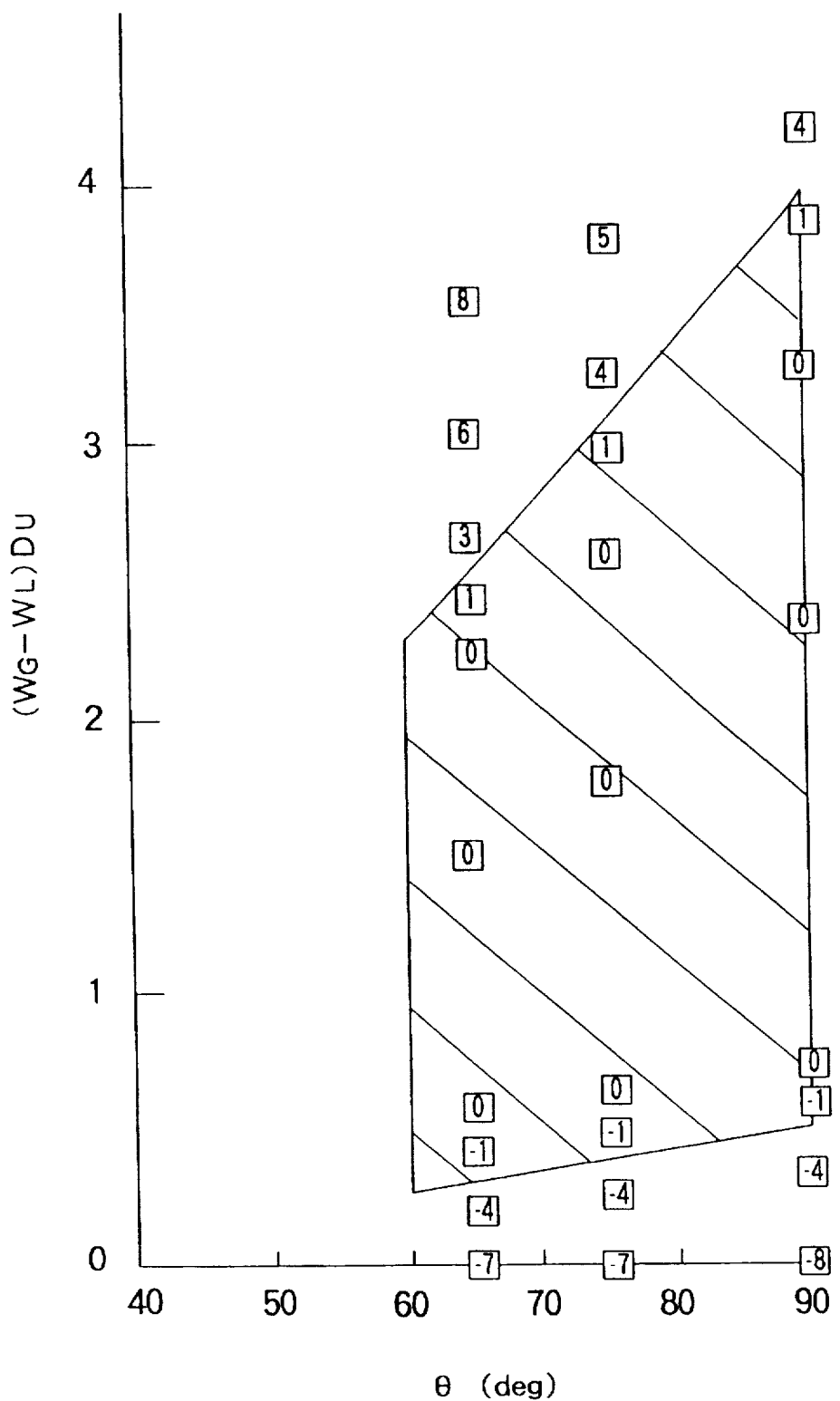
FIG. 4 is a diagram showing results evaluated signal symmetry of land portions and groove portions of optical discs due to embodiment 2 of the present invention.

Next, in the range of θ of 60° or more, the signal symmetry of the land portion and the groove portion was evaluated. As the result, the effect of the present invention was found to be further remarkable in the deep groove. The results are shown in FIG. 4. Further, since, in the above described embodiment 1, the present invention was found not to depend on the particular sputtering method, in this embodiment 2, with the eccentric rotation revolution method, the films were formed while varying the groove parameter and evaluated.

Since, in the deep groove, film is formed much than the case of the shallow groove at the groove-step portion, the effective track width at the position of the recording layer tends to be unsymmetrical. Therefore, as obvious from the comparison between FIG. 3 and FIG. 4, in the range of the present invention, more than the case of the shallow groove, the symmetry of the land/groove is excellent, but, when the condition being deviated outside the range of the present invention, more rapidly than the case of the shallow groove, unsymmetry becomes remarkable.

Thus, the effect due to an optical disc of the present invention is obtained more remarkably in the deep groove which is effective in suppression of the cross-erase. That is, according to the optical disc of the present invention, in addition to realization of land/groove recording/reproducing in which both the cross-talk and the cross-erase are scarce, the land characteristics and the groove characteristics can be coincided.

The above described embodiment 1, 2 are examples in which the present invention is applied to the optical discs with no reflective film. That is, the present invention was applied to the optical discs which were relatively equal in their thermal response of the land portion and the groove portion and can be operated with the nearly equal recording power and the like. Practically, since, in many cases, the reflective film is formed on the above described second transparent film, embodiments in which the present invention is applied to optical discs which have a reflective film will be described.

Figure 5:
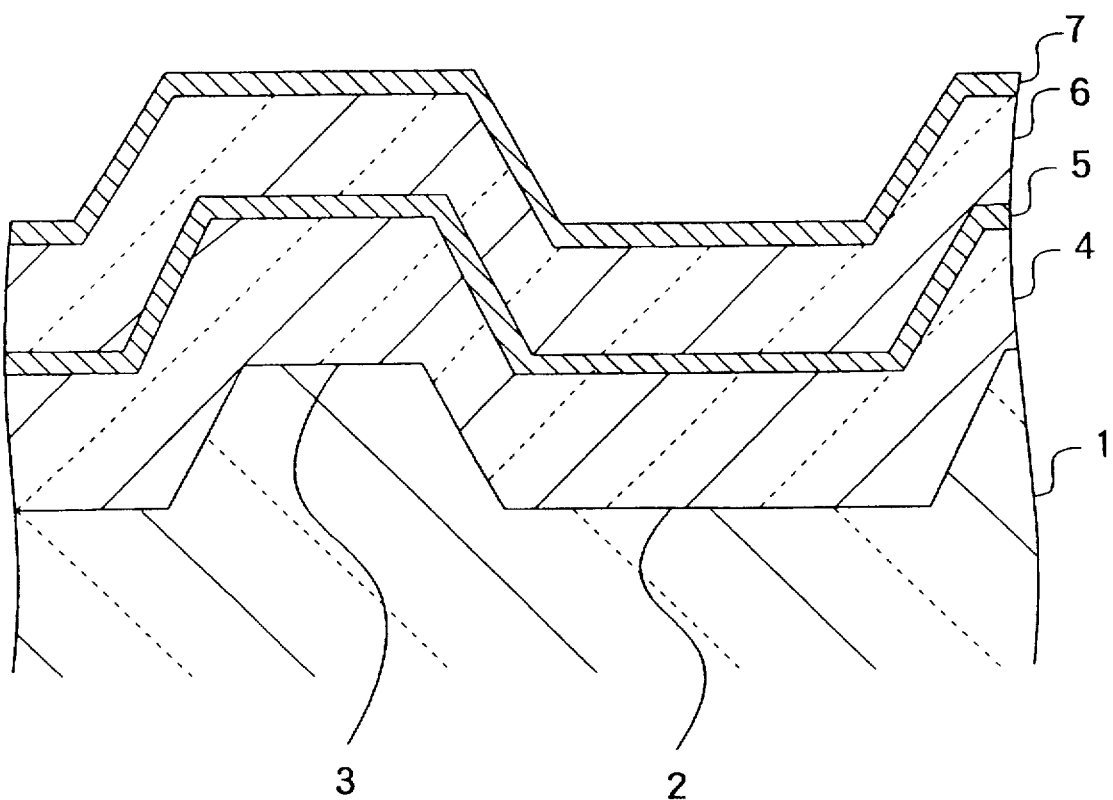
FIG. 5 is a cross-sectional view showing a structure of an essential portion of another embodiment of an optical disc of the present invention.

FIG. 5 is a cross-sectional view diagrammatically showing a structure of an essential portion of another embodiment of an optical disc of the present invention. In an optical disc shown in the same figure, a second transparent film 6 is formed on a recording layer 5, on the second transparent film 6 a reflective film 7 is formed. Further, the structure other than these is identical with an optical disc shown in FIG. 1.

For a reflective film 7, a material high in its thermal conductivity can be used. In specific, a material higher in its thermal conductivity than that of a disc substrate 1 can be used. As a constituent material of such a reflective film 7, for instance, aluminum based alloys such as, Al, Al—Mo, Al—Cr, Al—Ti and the like, Au, Cu and the like can be cited.

In Embodiment 3, specific example of this embodiment, the effect of the present invention was confirmed with an optical disc in which a reflective film is formed. The constitution of the formed medium film is as follows. That is, a film thickness $D_U$ of a ZnS—SiO$_2$ film as a first transparent film, as identical as the above described embodiment 1, 2, was 3 kinds of 50 nm, 100 nm, 150 nm, after forming thereon a translucent GeSbTe film of a film thickness of 15 nm as a recording layer, a ZnS—SiO$_2$ film of a film thickness of 20 nm as a second transparent film and an AlMo film of a film thickness of 100 nm as a reflective film were formed in this order. WL, WG, and θ were varied as identical as the above described embodiment 1, 2.

Here, the optimum recording power and the optimum erasing power of the land portion and the groove portion, as shown in FIG. 5, are different when heat flows in the lateral direction of the land portion and the groove portion are unsymmetrical. That is, the edge portion of the land portion (a recording layer 5 on a land 3) is located adjacent to a reflective film 7 high in its thermal conductivity, on the other hand, the edge portion of the groove portion (a recording layer 5 on a groove 2) is located adjacent to a first transparent film (for instance, interference film) 4 low in its thermal conductivity or a disc substrate 1. Therefore, in the land portion and the groove portion, there occurs a difference of a heat flow in the lateral direction.

The unsymmetry of the recording power and the erasing power becomes remarkable as the effective land width is narrow to the effective groove width, further, as the land width becomes narrow, the optimum recording/erasing power of the land portion becomes larger than the recording/erasing power of the groove portion.

Even in the optical disc of embodiment 3 in which a reflective film is formed, by varying the recording/erasing power at the land portion and the groove portion, the identical effect as FIG. 2 and FIG. 3 was obtained. However, when operated with the same recording/erasing power, in the range where the value of $(W_G - W_L)/D_U$ is large, unsymmetry of the signal due to mismatch of the recording power appears, the upper limit of the value of $(W_G - W_L)/D_U$, accordingly, was found to be preferable to be made smaller. As a concrete numerical value, when the value of $(W_G - W_L)$ is $3D_U(1 - \cos \theta)/\sin \theta$ or less, the difference of CNR of the land portion and the groove portion was able to be made within the range of ±1 dB with excellent reproducibility.

That is, in an optical disc having a reflective film, when the land portion and the groove portion were tried to be operated with the same power, the condition of $D_U(1 - \cos \theta)/2 \sin \theta \leq W_G - W_L \leq 3D_U(1 - \cos \theta)/\sin \theta$ is preferred to be satisfied.

In addition, in the above described embodiment and concrete examples thereof, all description was made mainly of a phase-change type optical disc, the present invention can be fundamentally applied to the whole optical discs which have disc substrates having a groove and have at the upper portion thereof a recording layer formed through a transparent film of a finite thickness. That is, the present invention can be broadly applied to, other than the phase-change type optical disc, a magneto-optical disc and an WORM disc which has a transparent film and, in all cases, is effective in improving the signal symmetry of the land/groove.

As obvious from the above described embodiments, according to the optical disc of the present invention, when the land/groove recording/reproducing is carried out, the signal symmetry of the land portion and the groove portion can be improved. Therefore, a land/groove recording/reproducing optical disc system excellent in its operation margin can be constructed.

What is claimed is:

1. An optical disc, comprising:

a disc substrate having grooves formed on its main surface and a land disposed between the grooves;

a transparent film formed on the main surface of the disc substrate; and a recording layer which is formed on the transparent film, in portions of the recording layer above both the grooves and the lands therebetween signal being recorded;

wherein, when a width of the land in the main surface of the disc substrate is $W_L$, a width of the groove in the main surface of the disc substrate is $W_G$, an average angle of inclination of a side wall of the groove is $\theta$, and a film thickness of the transparent film on a flat surface of the disc substrate is $D_U$, the average angle of inclination $\theta$ of the side wall of the groove is 50° or more and a relation of $$D_U(1-\cos \theta)/2 \sin \theta \leq W_G - W_L \leq 4D_U(1-\cos \theta)/\sin \theta$$

is satisfied.

2. The optical disc as set forth in claim 1:

wherein, when a depth of the groove is $D_g$, a refractive index of the disc substrate is n, and an wavelength of a light beam irradiated on the recording layer is $\lambda$, the depth of the groove satisfies $D_g > 80 /4n$.

3. The optical disc as set forth in claim 2:

wherein, an average angle of inclination $\theta$ of a side wall of the groove is 60° or more.

4. The optical disc as set forth in claim 1:

wherein, an average angle of inclination $\theta$ of a side wall of the groove is 90° or less.

* * * * *